Figure 1:
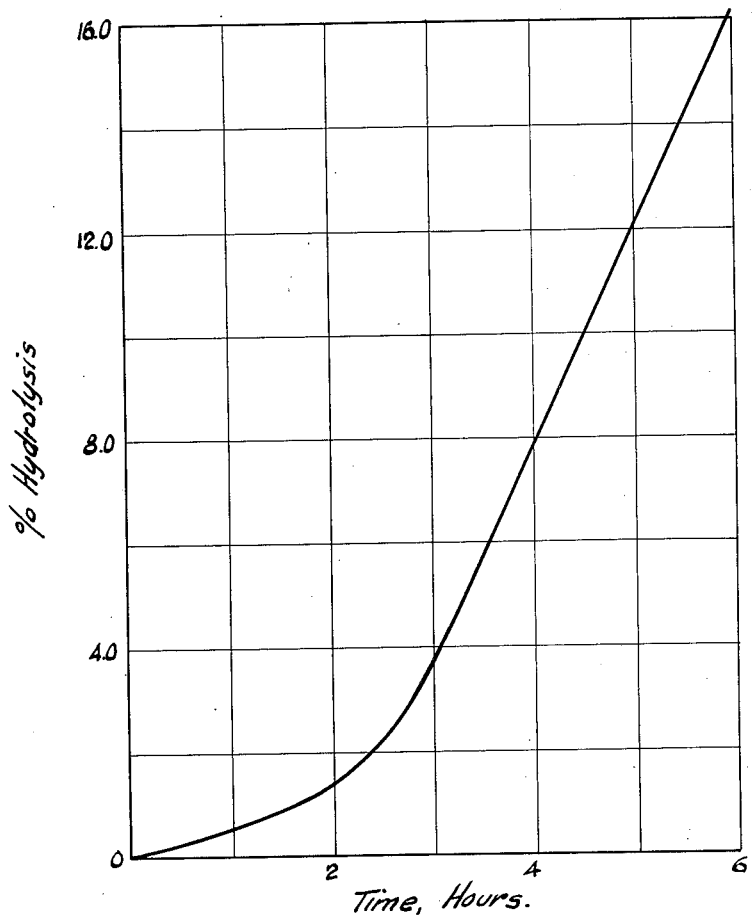

May 29, 1962 G. J. LAEMMLE 3,037,042
METHOD OF PURIFYING MONOAMINOALKYL SULFURIC ACID ESTERS
Filed Dec. 5, 1958 2 Sheets-Sheet 1

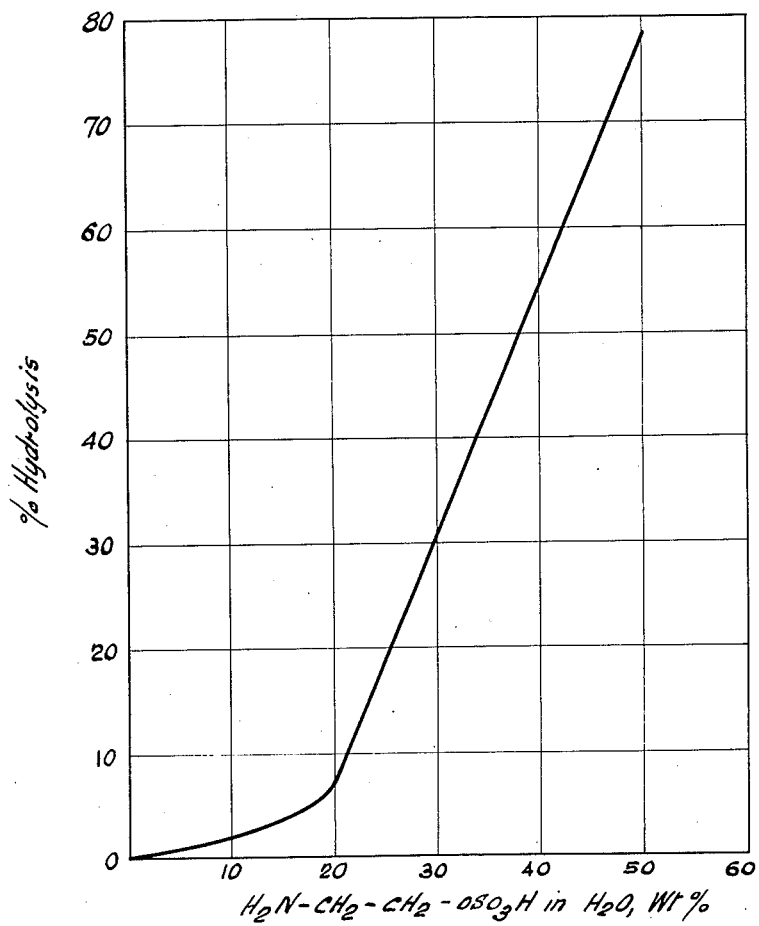

3,037,042
METHOD OF PURIFYING MONOAMINOALKYL SULFURIC ACID ESTERS

George J. Laemmle, Austin, Tex., assignor to Jefferson Chemical Company, Inc., Houston, Tex., a corporation of Delaware
Filed Dec. 5, 1958, Ser. No. 778,525
7 Claims. (Cl. 260—458)

This invention relates to a new and improved method of purifying monoaminoalkyl sulfuric acid esters of the structural formula $H_2N-R-OSO_3H$ wherein R is an alkylene radical containing from 2 to 7 carbon atoms and of the structure $-CR'_2-(CR'_2)_n-CR'_2-$ wherein $n$ is an integer from 0 to 3 and R' is selected from the group consisting of hydrogen and a lower alkyl radical containing from 1 to 3 carbon atoms. Although the above formula is the one normally accepted, some of the chemical and physical reactions of these ester compounds can only be accounted for by the following inner salt structure:

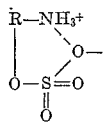

where R is as heretofore defined.

The sulfuric acid esters are useful as starting reactants in the preparation of alkylenimines, for example, ethylenimine. The alkylenimines are employed in the textile industry as agents for converting neutral substances into basic products which will accept dyes. In addition, the alkylenimines are employed as initial ingredients in the preparation of water-proofing compounds. For example, ethylenimine reacted with n-octyldecyl isocyanate forms 1-n-octyldecyl-1' ethylene urea. The latter compound is sold under the tradename "Persistol VS" as a waterproofing agent.

Specific examples of the monoaminoalkyl sulfuric acid esters contemplated herein are 2-aminoethyl sulfuric acid, 3-aminopropyl sulfuric acid, and 1-aminoisopropyl sulfuric acid.

A standard method of preparing the monoaminoalkyl sulfuric acid esters is reacting monoaminoalkanol of from 2 to 7 carbon atoms with sulfuric acid to first form the intermediate monoaminoalkanol hydrogen sulfate and then dehydrating the sulfate intermediate to form the ester product. The following chemical equations describe these reactions:

1. $HO-R-NH_2 + H_2SO_4 \rightarrow HO-R-NH_2.H_2SO_4$

2. 
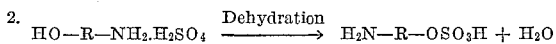

R is as heretofore defined.

The dehydration step requires relatively high temperature, e.g., of the order of 100–250° C. at atmospheric pressure. This high temperature, however, causes the crude ester product to take the form of a hard cake with impurities entrapped therein. In the past the purification of the crude ester product was a time consuming and costly task. It often required the mechanical pulverization of the ester and the slurrying of the pulverized ester with ethanol to obtain a somewhat purified product in a useful physical condition.

In accordance with the invention, I have discovered a novel, efficient, low cost and simple method of purifying the crude monoaminoalkyl sulfuric acid esters contemplated herein to obtain substantially pure, finely divided, crystalline product.

More specifically, I have dicovered that the hard cake of crude sulfuric acid ester reaction product can be effectively purified and formed into a fine physical state by dissolving said product in water containing a dilute concentration of a water soluble salt derived from the reaction of a weak acid having an ionization constant of less than $2 \times 10^{-5}$ at 25° C. and a strong base having an ionization constant of at least $2 \times 10^{-1}$ at 25° C., then subsequently recrystallizing the purified product therefrom. I have discovered the novel means of purification permits recovery of well over 90% of the crude ester as a purified product of esentially 100% purity.

Although it is well known in the prior art to purify other compounds by recrystallization from water, this procedure was not thought commercially feasible for a monoaminoalkyl sulfuric acid ester prior to the development of my novel method since this ester type readily hydrolizes in water to the hydrogen sulfate salt thereof as demonstrated by the following equation:

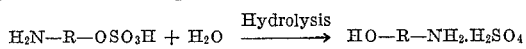

R is as heretofore defined.

FIG. 1 of the drawing graphically portrays the effect of time on the hydrolysis of 2-aminoethyl sulfuric acid ester. This graph shows that up to two hours the percent hydrolysis increases at a rate of less than 1% per hour and after 2 hours this rate sharply increases to about 4% per hour.

FIG. 2 of the drawing graphically portrays the effect of concentration on the hydrolysis of 2-aminoethyl sulfuric acid ester over a 3½ hour period. By inspection of the graph it can be seen that up to 20% ester concentration only about 7% of the ester hydrolizes, but thereafter hydrolysis sharply increases with approximately 80% of the ester hydrolizing at an ester concentration of 50%.

It is therefore concluded that hydrolysis of the sulfuric acid esters contemplated herein is accelerated by time at constant composition (FIG. 1) or by increasing concentration at constant time (FIG. 2). It is further concluded the hydrolysis is catalyzed by hydrogen ions (Equation I below). It is believed the hydrolysis reaction proceeds at a rate ultimately dependent on the hydrogen ion concentration and will accelerate with increasing time or concentration because the hydrolysis product, i.e., the aminoalkanol hydrogen sulfate is a strong (highly ionized) acid producing hydrogen ions as demonstrated by Equation II. R is as heretofore defined.

I. 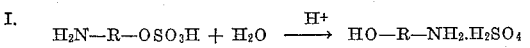

II. 

As can be seen purifying the sulfuric acid esters contemplated herein by recrystallizing from water would be expected to involve a large loss of the product through hydrolysis and, therefore, be commercially impracticable.

I have discovered that this hydrolysis can be substantially suppressed by recrystallizing sulfuric acid esters from an aqueous solution containing a dilute concentration, e.g., between about 0.1% and 1.0%, preferably between 0.2% and 0.6% based on the weight of the water component of a water soluble salt derived from the reaction of a weak acid having an ionization constant of less than $2 \times 10^{-5}$ at 25° C. and a strong base having an ionization constant of at least $2 \times 10^{-1}$ at 25° C. Specific examples of these hydrolysis inhibitor salts are sodium acetate (NaAc), potassium acetate, sodium propionate, potassium propionate, sodium dihydrogen phosphate, potassium dihydrogen phosphate, disodium hydrogen phosphate, dipotassium hydrogen phosphate, sodium dihydrogen citrate, potassium dihydrogen citrate, disodium hydrogen citrate dipotassium hydrogen citrate, sodium borate, potassium borate, sodium tetraborate, and potassium tetraborate.

It is believed the hydrolysis inhibitor salt as heretofore defined inhibits hydrolysis by converting the strong aminoalkanol hydrogen sulfate acid produced by hydrolysis (Equations I and II below) to a neutral ionized salt and a free acid which is substantially un-ionized as indicated in Equation III below. In other words it is theorized that the inhibitor salts prevent the hydrolysis of the sulfuric acid esters by suppressing the hydrogen ion concentration in the recrystallizing solution. This is demonstrated by the following equations.

I. 
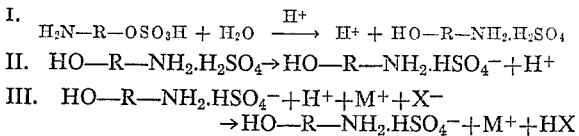

II. $HO-R-NH_2.H_2SO_4 \rightarrow HO-R-NH_2.HSO_4^- + H^+$

III. $HO-R-NH_2.HSO_4^- + H^+ + M^+ + X^- \rightarrow HO-R-NH_2.HSO_4^- + M^+ + HX$ MX = salt of strong base (MOH) and weak acid (HX).
R is as heretofore defined.

*Production of the Crude Sulfuric Acid Esters*

In a typical operation of the process of my invention a monoaminoalkanol of from 2 to 7 carbon atoms, inclusively, is combined with sulfuric acid of an acid strength of at least 50%, preferably above 90%, in approximate equimol quantities, at a temperature between about 100 and 250° C., preferably between about 130 and 230° C. At temperatures below 100° C. the reaction proceeds but becomes inefficient and the yield is substantially reduced. At reaction temperatures above 250° C. the desired ester product decomposes. The reaction mixture is preferably agitated in a reactor fitted with mixing blades which practically scrape the walls of said reactor in order to aid in preventing the build-up of a hard cake product on said walls. The reaction is also preferably conducted in the presence of a liquid organic solvent which will act as medium for the reaction and also as an entrainer for the water by-product during the distillation thereof. Such suitable liquid organic solvents include liquid hydrocarbons and chlorinated liquid aromatic hydrocarbons such as benzene, xylene, toluene, solvent naphtha, gasoline, monochlorobenzene, orthodichlorobenzene and mixed chlorotoluenes. If solvent is not used it is alternatively preferable to conduct the reaction under reduced pressure, e.g., 30 mm. Hg, in order to facilitate the removal of water formed during the reaction. Regardless of the particular procedure, the water removal is required in order to convert the intermediate salt, monoaminoalkanol hydrogen sulfate into the final ester product. The following chemical equations are illustrative of this point:

1. $HO-R-NH_2 + H_2SO_4 \rightarrow HO-R-NH_2.H_2SO_4$

2. $HO-R-NH_2.H_2SO_4 \xrightarrow{Dehydration} H_2N-R-OSO_3H + H_2O$

3. $H_2N-R-OSO_3H + H_2O \xrightarrow{Hydrolysis} HO-R-NH_2.H_2SO_4$

R is as heretofore defined. As can be seen reaction 3 will undesirably occur if water is not removed from reaction 2.

The removal of water from the reaction mixture is accomplished by distillation and is conducted until substantially complete, e.g., 95% removal. The solid crude monoaminoalkyl sulfuric acid ester is then separated from the liquid phase of the reaction mixture if such a phase exists by any of the conventional methods, e.g., decantation or filtration. Since the reaction mixture when cooled is often extremely viscous it is preferable to separate the solid and liquid phases by centrifugation rather than by employing a plate and frame filter press.

*Purification of the Crude Sulfuric Acid Esters*

The recovered crude ester product is then dissolved in water, containing between about 0.1% and 1.0%, preferably between 0.2% and 0.6%, based on the weight of the water, of the inhibitor salt as heretofore defined. In order to promote the solution of the crude ester and increase the amount of ester which can be dissolved in a given amount of the aqueous inhibitor salt solution the salt solution temperature is preferably maintained between about 50 and 125° C. more preferably between 100 and 125° C. It is also desirable to dissolve as much of the crude ester in the inhibitor salt solution as the volume and temperature of said salt solution will permit for reasons of economy and to insure the rapid and essentially complete recrystallization of the sulfuric acid ester. It is to be noted that when the solution of the crude ester is conducted above about 100° C. it is preferable to maintain this phase of the purification procedure under superatmospheric pressure, e.g., between 0 and 50 p.s.i.g., in order to prevent distillation of the water component. The aqueous solution of the inhibitor salt and ester is then cooled, e.g. to below about 40° C., preferably between about 0 and 20° C. to promote recrystallization of the ester. The mother liquor is then separated from the purified crystalline ester by any of the standard means such as filtration, decantation or centrifugation.

Since highly corrosive materials are employed and produced in the overall process, stainless steel or glass lined apparatus should be employed. Glass lined apparatus is preferred.

The following examples further illustrate the nature of the invention.

EXAMPLE I

This example illustrates the preparation of a crude monoaminoalkyl sulfuric acid ester without the novel purification steps of the invention.

Into a 3-neck Pyrex flask equipped with a stainless steel stirrer, thermometer and a distillation column attached to a water aspirator vacuum pump, there was charged 1012 parts of 96.7% sulfuric acid. Moderate stirring was begun and 617 parts of ethanolamine (2-aminoethanol) was added from a dropping funnel over a period of 30 to 40 minutes and the pressure in the reaction flask was adjusted to 30 mm. Hg. The reaction mixture was then heated to between 120–140° C. while maintaining the reduced pressure and until the water by-product essentially ceased to distill over. The residual reaction mixture amounting to 1420 parts was allowed to cool and solidify to a hard brown cake. This represented a yield of approximately 100% of theoretical.

The next two examples and tables illustrate the sharp reduction in product loss and increase in product purity through the employment of the novel purification method of the invention.

EXAMPLE II

In each of a series of test runs 100 parts of crude 2-aminoethyl sulfuric acid ester prepared in accordance with Example I were dissolved in 100 parts of an aqueous solution and the temperature of solution was maintained at 100° C. for a period of 2 or 4 hours. The solution was then allowed to cool to room temperature (20° C.) and was titrated with 0.5 N NaOH to determine the percent hydrolysis of the crude product. The data and results are reported below in Table I.

TABLE I.—HYDROLYSIS OF 2-AMINO ETHYL SULFURIC ACID

| Aqueous Solution | Ester Conc. in Solution, Wt., Percent | Temp. of Solution, °C. | Percent Hydrolysis (By Titration) | |
|---|---|---|---|---|
| | | | 2 Hrs. | 4 Hrs. |
| Distilled water | 50 | 100 | 14.7 | 72.6 |
| 0.8% NaAc in H₂O | 50 | 100 | 0 | 0.2 |
| 0.4% NaAc+0.3% Acetic Acid in H₂O | 50 | 100 | 0.6 | 0.6 |

EXAMPLE III

In each of a series of test runs 100 or 133 parts of the crude 2-aminoethyl sulfuric acid of Example I was added to 100 parts of an aqueous solvent and heated to 100 or 103° C. for a period of 1.5 or 3 hours whereupon it was cooled in an ice bath to room temperature. During the cooling stage the purified 2-aminoethyl sulfuric acid recrystallized from solution. The ester was separated from the mother liquor by filtration. The data and results are reported below in Table II:

TABLE II.—RECRYSTALLIZATION OF 2-AMINOETHYL SULFURIC ACID

| Aqueous Solvent | Ester Conc. in solution, Wt. Percent | Temp. of Sol., °C. | Time, Hrs. | Purified Ester | |
|---|---|---|---|---|---|
| | | | | Percent Recovery | Percent Purity |
| Distilled $H_2O$ | 50 | 100 | 3.0 | 17.5 | 86.8 |
| 0.8% NaAc in $H_2O$ | 50 | 100 | 3.0 | 91.0 | 100 |
| 0.4% NaAc in $H_2O$ | 57.1 | 103 | 1.5 | 95.0 | 100 |
| 0.16% NaAc in $H_2O$ | 57.1 | 103 | 1.5 | 95.5 | 100 |
| 0.7% Disodium Hydrogen Phosphate in $H_2O$ | 50 | 103 | 1.5 | 90.0 | 100 |

As can be seen from Tables I and II utilization of the inhibitor salts contemplated herein in the aqueous recrystallization solutions substantially prevent hydrolysis of the sulfuric acid esters, increase the amount of ester recovered by at least five fold and essentially eliminate all impurities in the recrystallized ester product.

In the foregoing and in the subsequent claims all percentages and parts are based on weight unless otherwise stated.

Obviously many modifications and variations of the invention, as hereinbefore set forth, may be made without departing from the spirit and scope thereof, and therefore only such limitations should be imposed as are indicated in the appended claims.

I claim:
1. A method of purifying a solid crude ester product of the formula $H_2N-R-OSO_3H$ where R is an alkylene radical having from 2 to 7 carbon atoms and of the structure $-CR'_2-(CR'_2)_n-CR'_2-$ wherein $n$ is an integer from 0 to 3 and R' is selected from the group consisting of hydrogen and a lower alkyl radical containing from 1 to 3 carbon atoms, comprising dissolving said ester in water containing between about 0.1 and 1.0% of a water soluble salt derived from the reaction of a weak acid having an ionization constant of less than $2\times10^{-5}$ at 25° C. and a strong base having an ionization constant of at least $2\times10^{-1}$ at 25° C., said dissolving at a temperature between about 50 and 125° C., subsequently cooling the resultant solution to a temperature below about 40° C., to selectively precipitate said ester to thereby provide a slurry of precipitated ester in mother liquor and recovering said precipitated ester from said mother liquor.

2. A method of purifying a solid, crude ester product of the formula $H_2N-R-OSO_3H$, where R is an alkylene radical having from 2 to 7 carbon atoms and of the structure $-CR'_2-(CR'_2)_n-CR'_2-$ wherein $n$ is an integer from 0 to 3 and R' is selected from the group consisting of hydrogen and a lower alkyl radical containing from 1 to 3 carbon atoms, said method comprising the steps of dissolving said ester at a temperature within the range of about 100° to 125° C. and a pressure within the range of about 0 to 50 p.s.i.g. in water containing from about 0.2 to about 0.6 wt. percent of a water soluble salt, cooling said solution to a temperature within the range of 0° to 20° C. to selectively precipitate said ester from said solution and to provide a slurry of precipitated ester in mother liquor and thereafter recovering said precipitated ester from said mother liquor, said salt being selected from the group consisting of sodium acetate, potassium acetate, sodium propionate, potassium propionate, sodium dihydrogen phosphate, potassium dihydrogen phosphate, disodium hydrogen phosphate, dipotassium hydrogen phosphate, sodium dihydrogen citrate, potassium dihydrogen citrate, disodium hydrogen citrate, dipotassium hydrogen citrate, sodium borate, potassium borate, sodium tetraborate and potassium tetraborate.

3. A method in accordance with claim 1 wherein said salt is sodium acetate.

4. A method in accordance with claim 1 wherein said salt is disodium hydrogen phosphate.

5. A method in accordance with claim 1 wherein said percent is between 0.2 and 0.6%.

6. A method in accordance with claim 1 wherein said temperature is maintained between 100 and 125° C. and wherein said resultant solution is cooled to between about 0 and 20° C.

7. A method in accordance with claim 1 wherein said ester is 2-aminoethyl sulfuric acid.

References Cited in the file of this patent

Rollins et al.: Jour. Amer. Chem. Soc., vol. 60 (1938), pp. 2312–14, 2751–52.
Suter: Organic Chemistry of Sulfur (1944), p. 38.